April 10, 1934.  O. BLITZ  1,954,064

DISPENSING DEVICE

Filed Oct. 12, 1932

INVENTOR.
OTTO BLITZ
BY Charles O. Bruce
ATTORNEY

Patented Apr. 10, 1934

1,954,064

UNITED STATES PATENT OFFICE 1,954,064

DISPENSING DEVICE

Otto Blitz, Oakland, Calif.

Application October 12, 1932, Serial No. 637,371

6 Claims. (Cl. 221—16)

My invention relates to a dispensing device, and particularly to a device for the dispensing of free flowing materials.

It is an object of my invention to provide a dispensing device which is of simple construction and which can be economically manufactured.

Another object of my invention is the provision of a portable dispensing device which requires but one hand of the operator in its use.

A further object of my invention is the provision in a dispensing device employing a valve, of means for actuating the valve by pressure against an external object.

Additional objects and advantages of my invention will be apparent from a perusal of the following description forming a part of my specification.

Referring to the drawing.

In broadly descriptive terms, my dispensing device comprises a container adapted to accommodate free flowing materials. An outlet orifice is provided for said container and a valve is employed for normally closing said orifice. For opening the valve, I provide means which is adapted to be actuated by pressure against an external object.

Figure 1:
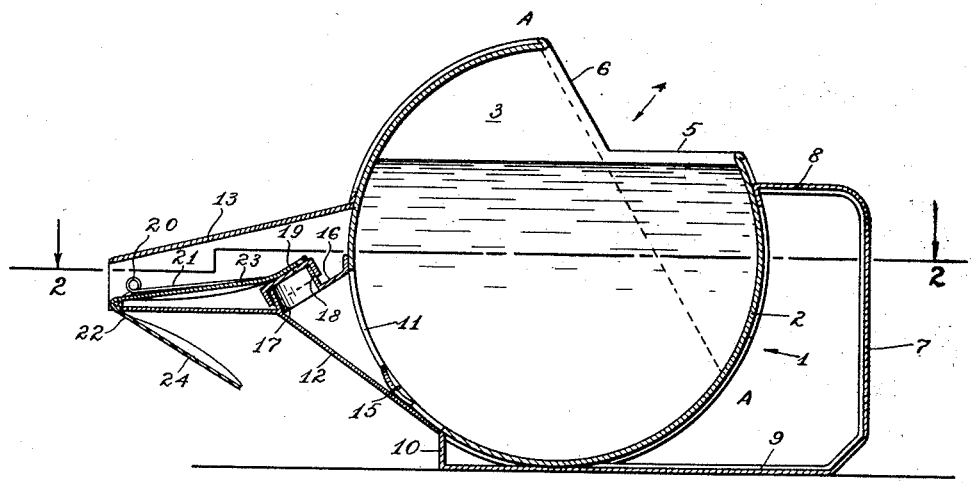
Figure 1 is a vertical sectional view of my device, partly in elevation, looking in the direction of the arrows 1—1 of Figure 2.
Figure 2:
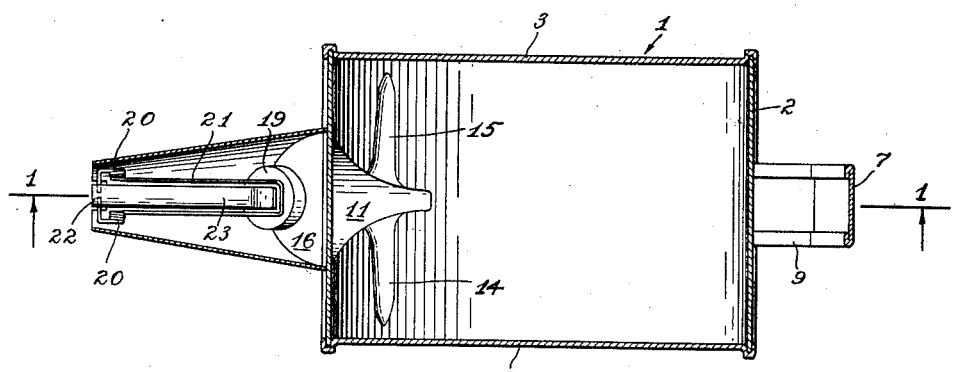
Figure 2 is a horizontal sectional view, partly in elevation, looking in the direction of the arrows 2—2 of Figure 1.
Figure 3:
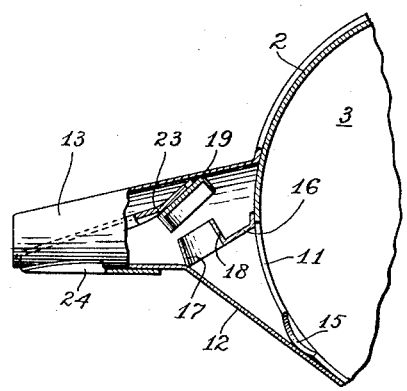
Figure 3 is a fragmentary view, partly in elevation and partly in section, illustrating the discharge end of my device.

With reference to the preferred construction, illustrated by the drawing, my device comprises a horizontal cylindrical container 1 of any suitable material, such as tin or copper, having an annular wall 2 and ends 3. A portion of the periphery of the container is cut away, as shown in Figure 1, to provide an open mouth 4 of relatively large size, through which the container may be easily filled. This mouth is so positioned and formed in the container that the lower lip 5 thereof is parallel with the base of the container when in normal filling position and gauges the maximum level of the material therein. The upper lip 6, on the other hand, gauges the maximum level of the material (shown by the dotted line A—A of Figure 1) when the container is in position of normal discharge.

A handle 7, preferably formed of sheet material, with its edges folded back upon itself for strength, is provided for the container. The ends of the handle are bent inwardly to form the arms 8 and 9, each of which is secured to the container wall 2 by any suitable means, such as by soldering thereto. I prefer that the lower arm 9 of the handle shall be secured tangentially to the annular wall of the container to provide a base for supporting the container in normal filling position. It will be observed that arm 9 extends past the point of tangency and is provided with an upturned flange 10 also secured to the wall 2, thus providing an extended base to resist the forward tipping of the container.

The annular wall 2 of the container is provided with an elongated aperture 11 which opens into a flared throat 12 forming a portion of the tapered spout 13. The wall 2, adjacent aperture 11, is depressed to form the channels 14 and 15, each sloping inwardly toward the throat 12 to facilitate the rapid draining of the container. A flat partition wall 16 extends from the juncture of the spout and throat to the annular wall 2 above the aperture 11 and serves to separate the throat passage from that of the spout. This partition wall is provided with an aperture or orifice 17 through which free flowing materials may pass from the container into the spout. An out-turned annular flange 18 is formed on the partition wall 16 adjacent the orifice to provide a seat for the valve 19. This valve is preferably cup-shaped to fit over the end of flange 18 and, if desired, a suitable gasket may be provided therefor to prevent leakage.

Means is provided whereby the valve 19 normally closes the orifice 17. This means is preferably a spring 20 secured in any suitable manner, such as by soldering, to the spout 13 adjacent its discharge end and having provided thereon a U-shaped tension arm 21 adapted to bear upon the valve 19.

For effecting movement of the valve 19 to open the orifice 17, a V-shaped lever 22 is provided. This lever is hinged or fulcrumed at its apex over the lower lip of spout 13. Preferably, the lever is of relatively rigid material so that it will not readily bend or break through use. It will be observed that the arm 23 of lever 22 projects into the spout 13 and has its end rigidly secured to the valve 19, while the other arm 24 extends backwardly and at an angle to the spout. This last mentioned arm is arcuately shaped in cross section and, when fully depressed, snugly rests against the external surface of the spout.

From the foregoing description, it is seen that if it is desired to dispense or discharge oil or other free flowing materials from the container through the spout, it is only necessary to actuate the valve opening the orifice 17 by pressing the exposed arm 24 of lever 22 against the rim or edge of the receptacle to be filled. Furthermore, it is to be observed that the entire operation of the device may be consummated by the use of but one hand of the operator.

Although I have described, for the purposes of illustration, the device shown by the drawing, it is apparent that such apparatus may assume different forms within the scope of the following which I claim as my invention.

I claim

1. A dispensing device comprising a container, a spout on said container, an outlet orifice for said container opening into said spout, a valve for closing said orifice, a spring adapted to normally close said valve, and means operable by external pressure for opening said valve, said means comprising a V-shaped lever fulcrumed on the spout and having one arm secured to said valve and the other arm extending externally of the spout.

2. A dispensing device comprising a horizontal cylindrical container having an open mouth in the top thereof, a spout on said container, a valve for controlling flow from said container through said spout, and a valve lever fulcrumed on said spout and adapted to be actuated to open said valve by pressure against an external object.

3. A dispensing device comprising a horizontal cylindrical container having a handle adapted to provide a base therefor, an open mouth in the top of said container having its lower lip lying in a plane parallel to said base and its upper lip lying in a plane which intersects said first mentioned plane at an obtuse angle, said upper lip being adapted to gauge the maximum level of material in the container when the container is in normal discharge position, an outlet orifice for said container, a valve normally closing said orifice, and means operable by pressure against an external object for opening said valve.

4. A dispensing device comprising a horizontal cylindrical container having an open mouth in the top thereof, said mouth having its lower lip adapted to gauge the maximum level of material in the container when the container is in normal filling position and its upper lip adapted to gauge the maximum level of material in the container when the container is in normal discharge position, an outlet orifice for said container, a valve normally closing said orifice, and means operable by pressure against an external object for opening said valve.

5. A dispensing device comprising a horizontal cylindrical container, a spout on said container, an elongated aperture in said container opening into said spout, a sloping channel in the container adapted to terminate in said spout, a valve for controlling flow from the container through said spout, and means operable by the insertion of said spout within an orifice for opening said valve.

6. A dispensing device comprising a horizontal cylindrical container, a spout on said container, an elongated aperture in said container opening into said spout, a plurality of sloping channels in the container adapted to terminate in said spout, a valve for controlling flow from the container through said spout, and means operable by the insertion of said spout within an orifice for opening said valve.

OTTO BLITZ.